United States Patent [19]
Embley

[11] 3,789,309
[45] Jan. 29, 1974

[54] DIGITAL COEFFICIENT ATTENUATOR

[75] Inventor: Ronald W. Embley, Toms River, N.J.

[73] Assignee: Electronic Associates Inc., Long Branch, N.J.

[22] Filed: Mar. 7, 1973

[21] Appl. No.: 338,736

[52] U.S. Cl. .................. 328/169, 307/237, 328/172, 330/29
[51] Int. Cl. .......................... H03k 5/08, H03b 3/02
[58] Field of Search ...... 307/237, 264; 328/72, 150, 328/168, 169, 171, 172, 173, 165; 330/29, 51, 86

[56] References Cited

UNITED STATES PATENTS

| | | | |
|---|---|---|---|
| 3,470,487 | 9/1969 | Lucas et al. | 330/51 X |
| 3,586,989 | 6/1971 | Wheable | 330/51 |
| 3,648,171 | 3/1972 | Hirsch | 328/162 X |
| 3,629,720 | 12/1971 | Sedra et al. | 330/86 |
| 3,729,687 | 4/1973 | Orlandini | 330/51 |

*Primary Examiner*—Rudolph V. Rolinec
*Assistant Examiner*—L. N. Anagnos
*Attorney, Agent, or Firm*—Robert M. Skolnik

[57] ABSTRACT

A digital coefficient attenuator having a first and a second amplifier with a ladder network connected between the first amplifier output and the second amplifier input and switchable in accordance with applied logic signals for providing attenuation at a selected coefficient value. A first analog gate connected between an input signal source and the first amplifier input and a second analog gate is connected between a reference potential source and the first amplifier input. The gates are selectively operated so that with the first gate turned on there is produced at the second amplifier output an attenuated input signal in accordance with the selected coefficient value and with the second gate turned on there is produced at the second amplifier output a direct readout of the selected coefficient value.

11 Claims, 3 Drawing Figures

DIGITAL COEFFICIENT ATTENUATOR

BACKGROUND OF THE INVENTION

1. Field of the Invention

This invention relates to the field of digital coefficient attenuators with analog coefficient readout.

2. Prior Art

In the prior art servo-set potentiometers have been widely used. In operation of these potentiometers an input has been applied to a patch panel and the wiper of the potentiometer applied to a null amplifier. The servo turns the potentiometer until a null is reached. In order to read the output of the potentiometer a relay is actuated to apply a reference potential rather than the input potential to the potentiometer. The potential at the wiper is then read as the output which is a direct representation of the potentiometer setting. Instead of a servo-set potentiometer, solid state digital coefficient attenuators (DCA) have been developed though a relay was still used.

In both of the above applications, the relay wiper contacts either the patch panel input or the reference potential. Such relays have provided voltage switching and thus have left much to be desired for several reasons. Since there is substantial magnitude of capacitance between the relay wiper or moveable contact and ground, that capacitance becomes charged. During discharge, the capacitance has produced arcing across the relay contacts effectively destroying them. In addition, such relays have not been very reliable and also transients have been a problem. Transients have been a particular problem since they disturb the digital register that sets the switches in the DCA.

SUMMARY OF THE INVENTION

A digital coefficient attenuator system which is switchable by applied logic signals between a normal attenuating mode for attenuating an input signal in accordance with a coefficient value and sign and an analog coefficient select mode. A ladder network is connected between an output of a first amplifier and an input of a second amplifier and is switchable in accordance with the logic signals for providing attenuation at a selected coefficient value. A first analog gate is connected between a source of input signals and a first amplifier input. A second analog gate is connected between a source of reference potential and the first amplifier input. The analog gates are selectively switched (1) to turn on the first analog gate for producing at the second amplifier output an attenuated input signal in accordance with the selected coefficient value and sign and (2) to turn on the second analog gate for producing at the second amplifier output a direct readout of the selected coefficient value.

DESCRIPTION OF THE PREFERRED EMBODIMENTS

Figure 1:
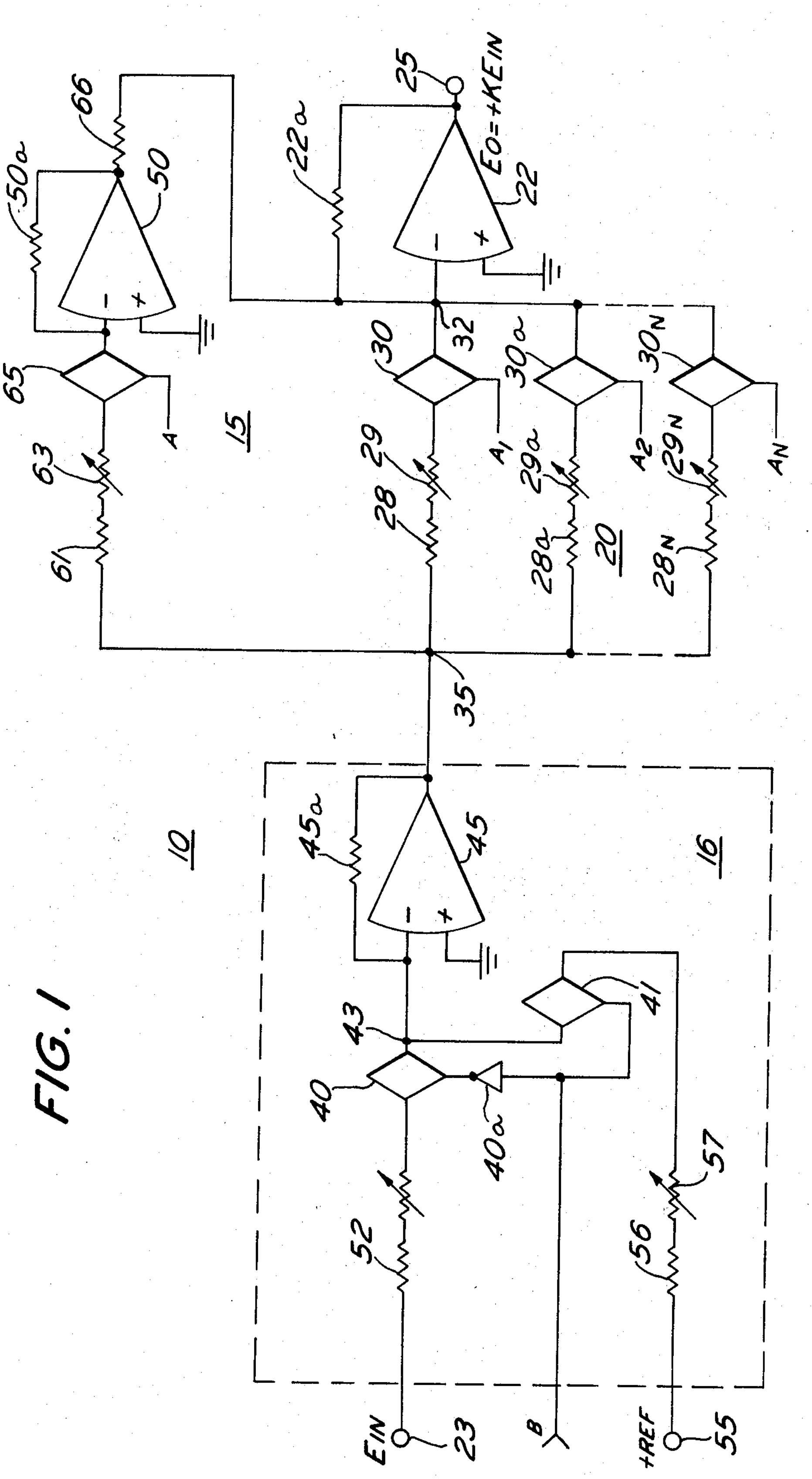
FIG. 1 schematically illustrates a digital coefficient attenuator embodying the invention.

Referring now to FIG. 1 there is shown a binary digital coefficient attenuator (DCA) with analog coefficient readout. DCA 10 is made with all solid state elements and is designed for a 10 volt system. For operation as a four quadrant system, DCA 10 includes a sign loop 15.

DCA 10 further includes a solid state switching system 16 including buffer amplifier 45 which replaces the prior art relay previously required. The switching system switches between $E_{IN}$ and Ref. under the control of logic signal B. The desired attenuation for DCA 10 is provided by a ladder network 20 which feeds an amplifier 22. Input potential $E_{IN}$ is applied to terminal 23 and output potential $E_0$ is taken at output terminal 25.

Ladder network 20 comprises a series of binary weighted impedances (resistors) 28—28$_N$ in which resistor 28 has a relative value 2R; resistor 28$a$ a value 4R . . . and resistor 28$_N$ has a value $2^N$R. Resistors 28—28$_N$ are connected together at one end to junction 35 and at the other end are connected by way of respective variable resistors 29—29$_N$ to respective switched terminals of analog gates 30—30$_N$. The other switched terminals of each of analog gates 30—30$_N$ are connected together to a summing junction 32 of an amplifier 22. The left hand end of each of the binary weighted resistors 28—28$_N$ are connected together to a junction 35. Gates 30—30$_N$ are shunt current switches and will later be described in detail.

With one of the gates 30—30$_N$ turned on, current is steered to summing junction 32. When the gate is turned off, current is switched to ground. Each of the gates 30—30$_N$ is under the control of an input logic signal $A_1$–$A_N$, respectively, with each of these signals being applied from a respective output of a conventional coefficient register (not shown) n flip-flop stages which store the coefficient word in digital form in the DCA. Network 20 provides an attenuation at a coefficient value K between junctions 35 and 32 in accordance with the digital value applied by the coefficient register to gates 30—30$_N$. In this manner, the coefficient register loads the gates with a desired digital value. The coefficient register is loaded from a digital computer or a keyboard.

For purpose of explanation herein it will be assumed that a 1 bit is representative of a potential greater than 2.0 volts and an 0 bit is representative of a potential less than +0.8 volts. Al applied to an analog gate is effective to turn the gate on and 0 is effective to turn the gate off.

System 16 includes analog gates 40 and 41 (incidental to gates 30—30$_N$) with one switched terminal of each of the gates being connected to a summing junction 43 of buffer amplifier 45. Amplifiers 22, 45 and 50 each comprise a differential operational amplifier having an input terminal grounded with a feedback resistor (resistors 22$a$, 45$a$ and 50$a$, respectively) connected between the ungrounded input and the output. Each of the feedback resistors has a relative resistance value R and thus each of the amplifiers acts as an inverter with a gain of one.

Logic signal B directly controls gate 41 and is applied through logic inverter 40a to control gate 40. Accordingly, when $B$=0, gate 40 is turned on and input potential $E_{IN}$ at terminal 73 is applied through an input resistor 52 (of value R), variable resistor 53, gate 40 to summing junction 43 of operational amplifier 45, the output of which is connected to junction 35. On the other hand with $B$=1 gate 40 is turned off and gate 41 is turned on so that the reference potential at terminal 55 is applied through an input resistor 56 (of value R) and a variable resistor 57 and then through gate 41 to summing junction 43.

For sign loop 15, junction 35 is connected by way of an input resistor 61 (of relative value R), variable resistor 63, analog gate 65, amplifier 50, output resistor 66 (of relative value R) and then to summing junction 32, Gate 65 is the same as gates 30—$30_N$ and 40, 41 and gate 65 is controlled by logic signal A. With $A = 0$, $B = 0$, ladder 20 and amplifier 22 provide a coefficient of $-K_1$. Since amplifier 45 provides an additional inversion, then at DCA output 25.

$$E_0 = +K_1 E_{IN} \quad (1)$$

However, with $A = 1$, $B = 0$, sign loop 15 is turned on causing an additional inversion so that ladder 20 and amplifier 22 thus provide a coefficient of $+K_2$. With the inversion of amplifier 45, the output at DCA output terminal 25 is then $$E_0 = -K_2 E_{IN} \quad (2)$$

It will be understood that the foregoing discussion is of the normal attenuating mode in which DCA 10 acts as an attenuator with varying input signals $E_{IN}$. Accordingly, $E_{IN}$ is attenuated and appears at the output in accordance with the selected coefficient and sign. In order to change to the analog coefficient select mode, logic signal B is made equal to 1 and thus gate 41 is turned on and gate 40 turned off. Thus the effective input to switching system 16 is +Ref potential. Then substituting in equation 1

$$E_0 = +K_1 Ref \quad (3)$$

If $+Ref$ is selected to be one machine unit or full scale value then $$E_0 = +K_1 \quad (4)$$

It is in this manner that the values of coefficient may be read directly from terminal 25 as with prior servoset potentiometers.

It will now be understood that a truth or state table for logic signals A and B may be set forth in the following.

TABLE

| Normal Attenuating Mode | A | B |
|---|---|---|
| Positive | 0 | 0 |
| Negative | 1 | 0 |
| Analog Coef. Select Mode | | |
| Positive | 0 | 1 |
| Negative | 1 | 1 |

In a particular example for the normal attentuation mode-positive, where $$A_1 = 1 \quad (5)$$

If the gates of ladder 20 are loaded as follows $$A_2 - A_N = 0 \quad (6)$$

$$\therefore, K = +\tfrac{1}{2} \quad (7)$$

$$E_0 = +\tfrac{1}{2} \times E_{IN} \quad (8)$$

On the other hand, in another example for the normal attenuation mode-negative, where $$A_1 = 1 \quad (9)$$

If the ladder is loaded as follows $$A_2 - A_N = 0 \quad (10)$$

$$\therefore, K = -\tfrac{1}{2} \quad (11)$$

$$E_0 = -\tfrac{1}{2} E_{IN} \quad (12)$$

Figure 3:
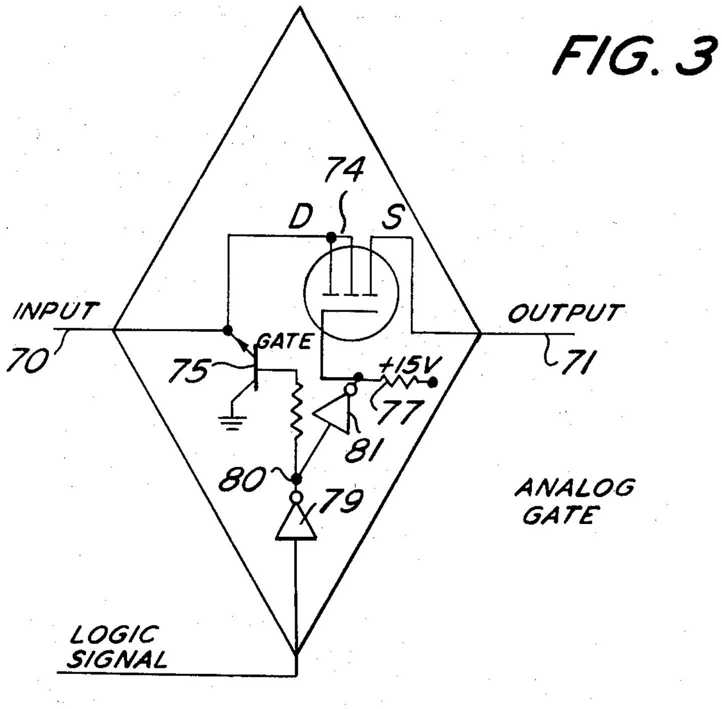

Referring now to FIG. 3 there is shown in detail one kind of analog gate that may be used for analog gates 30—$30_N$, 40, 41 and 65. Input 70 of the gate is applied to the drain of an N channel MOS FET 74 and also to the emitter of an NPN transistor 75, the collector of which is connected to ground. The source terminal of FET 74 is connected to output 71 with the gate connected by way of a resistor 77 to a positive source. A logic signal is applied to a logic inverter 79 the output of which is connected by way of a junction 80 to the base of transistor 75 and through an open collector logic inverter 81 to the gate.

For a logic signal 0, there is produced a 1 at junction 80 which is effective to turn on transistor 75 and by way of inverter 81 to turn off FET 74. Thus input 70 is effectively connected to ground by way of transistor 75.

With a logic signal 1, a 0 is produced at junction 80 which is effective to turn off transistor 75 and turn on FET 74. Thus input 70 is effectively connected through the substantially small value resistance of FET 74 to output 71.

It will be recalled in FIG. 1 that the output of each of the analog gates is connected to a respective amplifier summing junction. Accordingly, current switching is provided in which current from input 70 is steered either to ground with transistor 75 on or is steered to a summing junction with FET 74 on.

Figure 2:
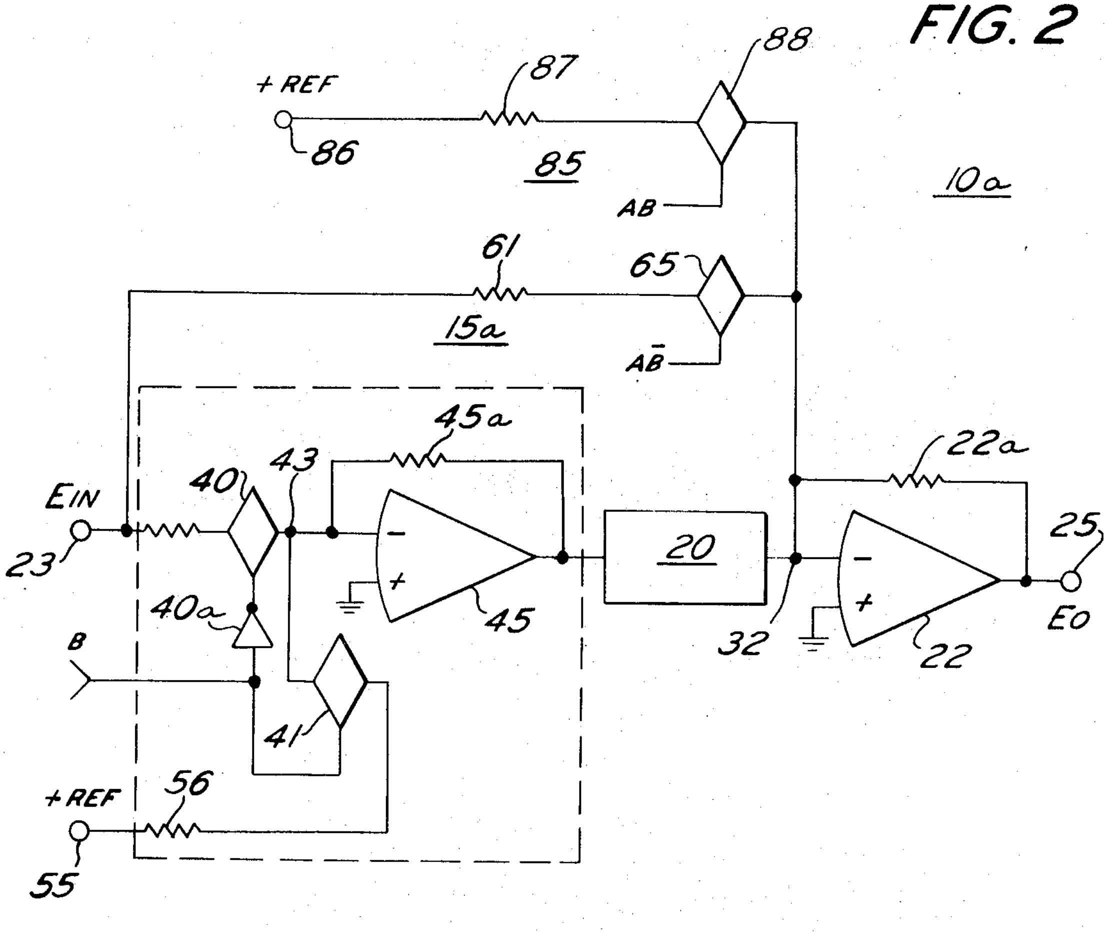
FIG. 2 schematically illustrates another form of the invention of a digital coefficient attenuator; and, FIG. 3 schematically illustrates in detail an analog gate of the type used in FIGS. 1 and 2.

Referring again to FIG. 1 it will be understood that amplifier 45 is required as a buffer amplifier between junctions 43 and 35. As previously described gates 40 and 41 are current switches and if such switches were tied directly to ladder 20 they would then be working into a high voltage rather than into a summing junction virtual ground. However, amplifier 50, which provides inversion, may be eliminated if the sign loop were connected to input terminal 23 as illustrated in FIG. 2 where the inherent inversion of amplifier 45 performs the sign function. In FIG. 2 components similar to those shown in FIG. 1 have been labeled with the same reference characters, ladder 20 has been shown as a block and certain adjustable components have not been shown for purposes of simplicity.

The operation of FIG. 2 is similar to that of FIG. 1 previously described except for the following differences. The logic signals applied to gate 65 of sign loop 15*a* are $A\bar{B}$ so that gate 65 is turned on only during the normal attenuating mode-negative as shown in the table. In this mode, with gate 40 on, the inversion function required by sign loop 15a is provided by amplifier 45. However, in the analog coefficient select mode-negative, gate 40 is turned off so that the inversion required by sign loop 15*a* can no longer be supplied. While the +Ref potential at terminal 55 may be applied as an input through gate 41 and amplifier 45 to ladder 20, a different way must be provided to substitute for the action of sign loop 15*a*.

It will be remembered in FIG. 1 during the analog coefficient select mode-negative + Ref is inverted by amplifier 45 and then reinverted by amplifier 50 for application of +Ref to junction 32. Accordingly, + Ref insertion circuit 85 is provided in which +Ref is applied to terminal 86 and then through a resistor 87 (having a relative value R), an analog gate 88 to junction 32. The gate is turned on by logic signals AB. Thus during the analog coefficient select mode-negative +Ref is applied directly to junction 32.

What is claimed is:

1. A digital coefficient attenuator system switchable by applied logic signals between a (1) normal attenuating mode (a) positive or (b) negative for attenuating an input signal in accordance with a coefficient value and sign and (2) analog coefficient select mode (a) positive or (b) negative comprising

- a first and a second analog gate each switchable by respective logic signals between an on and an off state,
- a first and a second amplifier having respectively a first and a second amplifier input and a first and a second amplifier output,
- a ladder network connected between said first amplifier output and said second amplifier input and switchable in accordance with said logic signals for providing attenuation at a selected coefficient value, and
- means connecting said first analog gate between a source of said input signal, and said first amplifier input and said second analog gate between a source of a reference potential and said first amplifier input for selectively (1) turning on said first analog gate for producing at said second amplifier output an attenuated input signal in accordance with said selected coefficient value and sign and (2) turning on said second analog gate for producing at said second amplifier output a direct readout of said selected coefficient value.

2. The digital coefficient attenuator of claim 1 for providing four quadrant operation in which there is included a third analog gate switchable by logic signals between an on and an off state, and sign means connecting said third analog gate to said second amplifier input for applying in accordance with said logic signals an additional inversion to said second amplifier input.

3. The digital coefficient attenuator system of claim 2 in which said sign means includes a series loop of an amplifier and said third analog gate with said sign means having an input coupled to said first amplifier output whereby upon said third analog gate being turned on by a logic signal said sign means inverts the signal at said first amplifier output and applies it to said second amplifier input.

4. The digital coefficient attenuator system of claim 3 in which said first, second, and third analog gates are solid state with each providing current switching for steering current (1) to ground when the gate is turned off and (2) to an amplifier input when the gate is turned on.

5. The digital coefficient attenuator system of claim 3 in which said logic signal is directly applied to said second analog gate and in which there is provided a logic inverter through which said logic signal is applied to said first analog gate.

6. The digital coefficient attenuator system of claim 3 in which said ladder network comprises a plurality of binary weighted resistance switching means each switched by an individual logic signal.

7. The digital coefficient attenuator system of claim 6 in which each of said resistance switching means includes an individual current switching analog gate having a logic signal applied thereto.

8. The digital coefficient attenuator system of claim 2 in which said sign means comprises a loop having an input coupled to said input signal source connection to said first gate, a fourth analog gate being coupled between said reference potential source and said second amplifier input whereby (1) during said normal attenuating mode-negative said third gate is turned on and said fourth gate turned off for feeding said input signal to said second amplifier input and (2) during said analog coefficient select mode-negative said third gate is turned off and said fourth gate turned on for applying said reference potential to said second amplifier input.

9. The digital coefficient attenuator system of claim 8 in which each of said first and second amplifier inputs comprises a summing junction said first, second, and third analog gates each provide current switching for steering current (1) to ground when the gate is turned off and (2) to a summing junction when the gate is turned on.

10. The digital coefficient attenuator system of claim 9 in which said ladder network comprises a plurality of binary weighted resistance switching means each switched by an individual logic signal.

11. The digital coefficient attenuator system of claim 10 in which each of said resistance switching means includes an individual current switching analog gate.

* * * * *